Dec. 28, 1954 J. M. CAGE 2,698,388

TELEVISION CHANNEL SELECTOR

Filed June 13, 1952 3 Sheets-Sheet 1

INVENTOR.
JOHN M. CAGE
BY
Eyre, Mann & Barrows
ATTORNEYS

Dec. 28, 1954 J. M. CAGE 2,698,388

TELEVISION CHANNEL SELECTOR

Filed June 13, 1952 3 Sheets-Sheet 2

INVENTOR.
JOHN M. CAGE
BY
Eyre, Mann & Barrows
ATTORNEYS

Dec. 28, 1954 J. M. CAGE 2,698,388

TELEVISION CHANNEL SELECTOR

Filed June 13, 1952 3 Sheets-Sheet 3

INVENTOR.
JOHN M. CAGE
BY
Eyre, Mann & Burrows
ATTORNEYS 2,698,388
Patented Dec. 28, 1954

2,698,388

TELEVISION CHANNEL SELECTOR

John M. Cage, Upper Montclair, N. J.

Application June 13, 1952, Serial No. 293,474

6 Claims. (Cl. 250—40)

The present invention relates to television receivers and more particularly to channel switching mechanism for such receivers and comprises a compact mechanism of this type which carries separate tunable circuits for each channel that are electrically isolated from each other and from the remainder of the receiver circuit. The mechanism is of compact sturdy construction, needs no gear trains or the like, and permits each circuit to be separately tuned while operatively connected in the receiver circuit. The mechanism is of general drum configuration, permitting manual rotation for channel selection. Fine tuning means, common to all circuits, is included within the mechanism.

Briefly, the new selector or tuner comprises a skeleton drum mounted for rotation about a fixed hollow shaft and provided along its length with a plurality of radially disposed compartments within which are insulatedly mounted tunable circuit elements, for example, permeability tunable inductors. A row of fixed contacts on the exterior of the shaft and a plurality of rows of contacts on the inner surface of the drum cooperate to connect the electrical elements in any one longitudinal row of compartments with the rest of the television receiver circuit. The means for tuning each element is accessible externally of the drum and the circuit carrying parts of the drum are removable.

For a better understanding of the invention reference may be had to the accompanying drawings, of which—

Figure 1:
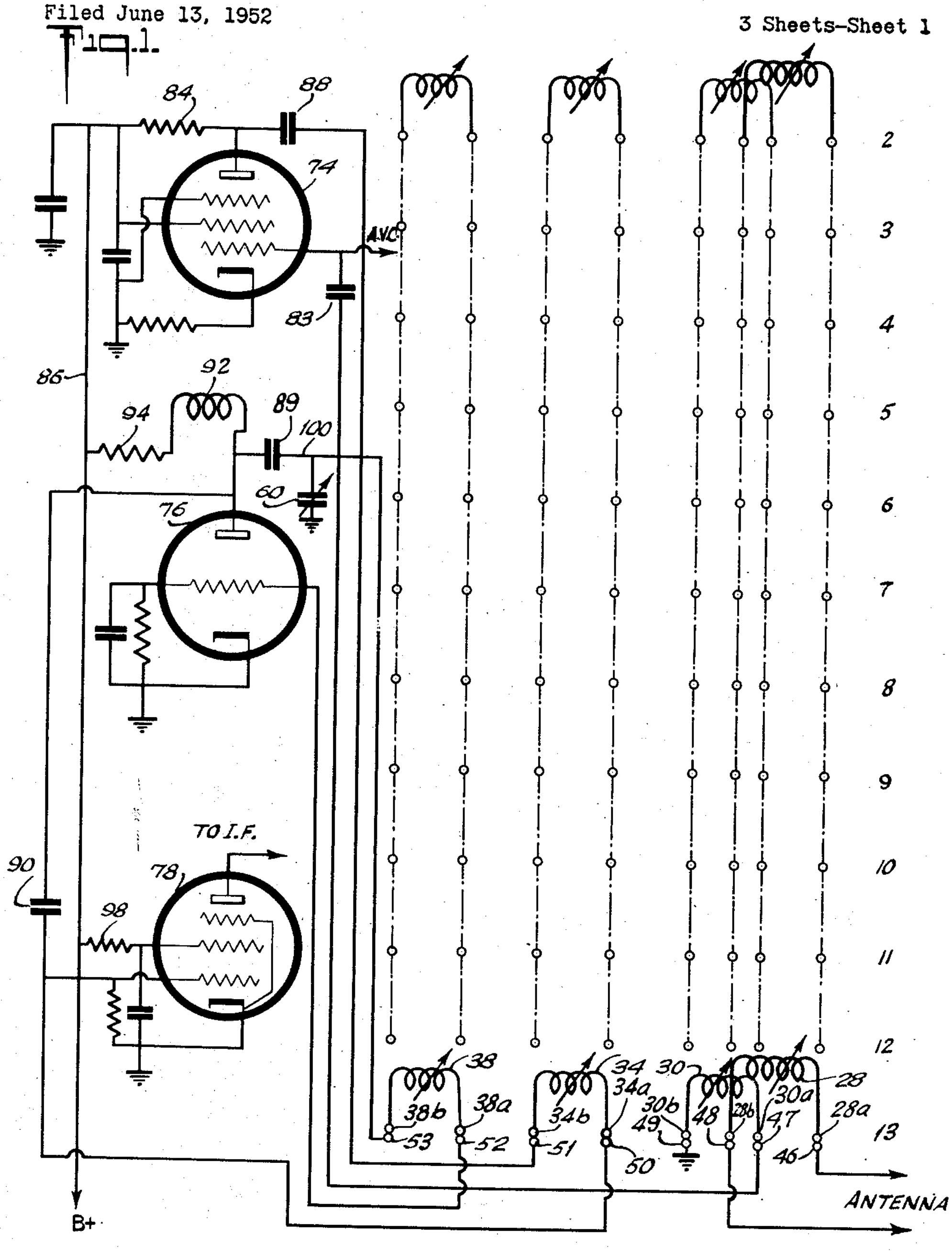
Fig. 1 is a schematic diagram of the circuit of the new selector.

The physical construction of the new tuner will first be described with reference to Figs. 2 through 5. The new selector includes a fixed housing comprising a front panel 2, side walls 4, top and bottom walls 5 and 6 respectively, of which the central portion of each is arcuate in section, an inner cylindrical part 7 and a back wall 8. A longitudinal slot 7′ is provided in the upper surface of part 7 and the upper arcuate section of the upper wall 6 is cut away to leave a longitudinal opening 6′. The panel 2 is formed with a centrally apertured, forwardly extending hub 10 through which extends a hollow rotatable stub shaft 12 on the forward end of which is secured a knob 14 and on the inner end of which is secured a disc 16. A segmental drum 18, formed of annular end walls 19 and 20 interconnected by longitudinal radially disposed strips 21 and of arcuate vanes 22 interconnecting the strips 21 is disposed about the cylindrical part 7 of the frame. End wall 20 of the drum is secured, as by welding, to disc 16 and end wall 19 is rotatably supported from the rear wall 8 of the casing by bearings 23. A sleeve 24 of insulating material is disposed about the part 7, the sleeve having a thickened wall section 24′ overlying the opening 7′ (see Fig. 5).

Figure 2:
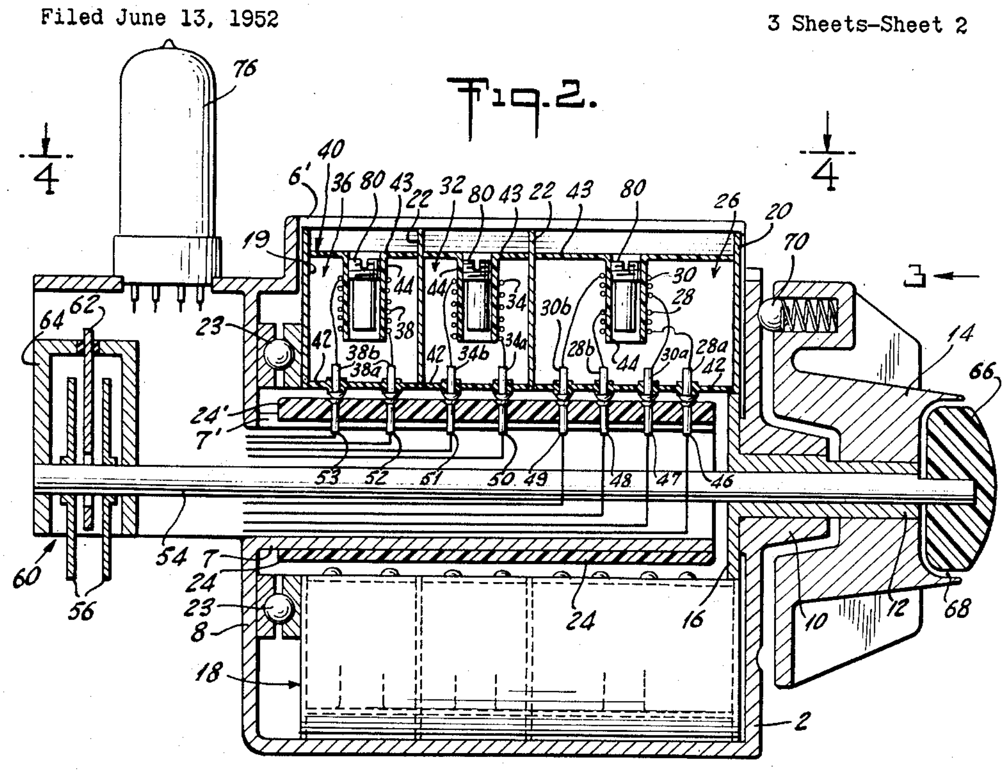
Fig. 2 is a transverse sectional view of the selector taken on the line 2—2 of Fig. 3.

As shown best in Fig. 2, the vanes 22 and strips 21 divide the drum 18 into a plurality of rows of compartments, the number of rows of compartments corresponding to the number of channels to be selected (channels 2 through 13 in the specific embodiment illustrated).

In the specific embodiment of the invention illustrated in the drawing there are three compartments in each row, the forward compartment containing two inductively coupled inductors and the intermediate and rear compartments each containing one inductor. For any angular position of the drum 18 only those inductors carried within the compartments of the uppermost row are connected into the receiver circuit. In the position of the drum 18 illustrated in Figs. 2, 3 and 5, the row of compartments carrying the inductors for channel 13 is in this position. The forward compartment 26 of this row contains two tunable inductors 28 and 30 inductively coupled together, the intermediate compartment 32 contains a single tunable inductor 34, and the rear compartment 36 contains a tunable inductor 38.

Fitted snugly within each compartment of the drum and supporting the inductor therein is a removable member 40 of insulating material. Each member 40 comprises a pair of radially disposed side walls 41 which lie flush against and are supported by the strips 21 of the drum 18, a bottom or inner wall 42 interconnecting the side walls and an outer wall or cover 43 having an inwardly projecting tubular section 44. The coils of the various inductors are wound about the tubular sections 44 and the associated cores of the inductors are threadedly supported within these sections. The inner wall 42 of each member 40 is penetrated by contact carrying conducting pins connected to opposite ends of the coil or coils of the inductor or inductors supported therein. The contacts associated with inductor 28 are indicated by the reference symbols 28*a* and 28*b*, those associated with inductor 30 by the symbols 30*a* and 30*b*, and, similarly, those associated with inductors 34 and 38 as 34*a* and 34*b*, and 38*a* and 38*b*, respectively. Penetrating the sleeve 24 above the slot 7′ of part 7 is a row of fixed contacts 46, 47, 48, 49, 50, 51, 52 and 53 which are permanently connected by suitable wiring passing through the hollow core of the part 7 with electron tubes of the television receiving circuit as hereinafter described in connection with the circuit diagram of Fig. 1. The contacts 46 to 53 inclusive, in cooperation with the contacts carried in the base of the members 40 serve to connect into the television receiver circuit the particular circuit elements in the row of compartments disposed along the upper surface of the part 7, which row depends, of course, upon the particular position to which the drum 18 has been rotated by the knob 14 for selection of a particular channel. As there is but one row of fixed contacts, namely the contacts 46 to 53 inclusive, only one set of tunable elements will be connected in the circuit at any one time.

Figure 3:
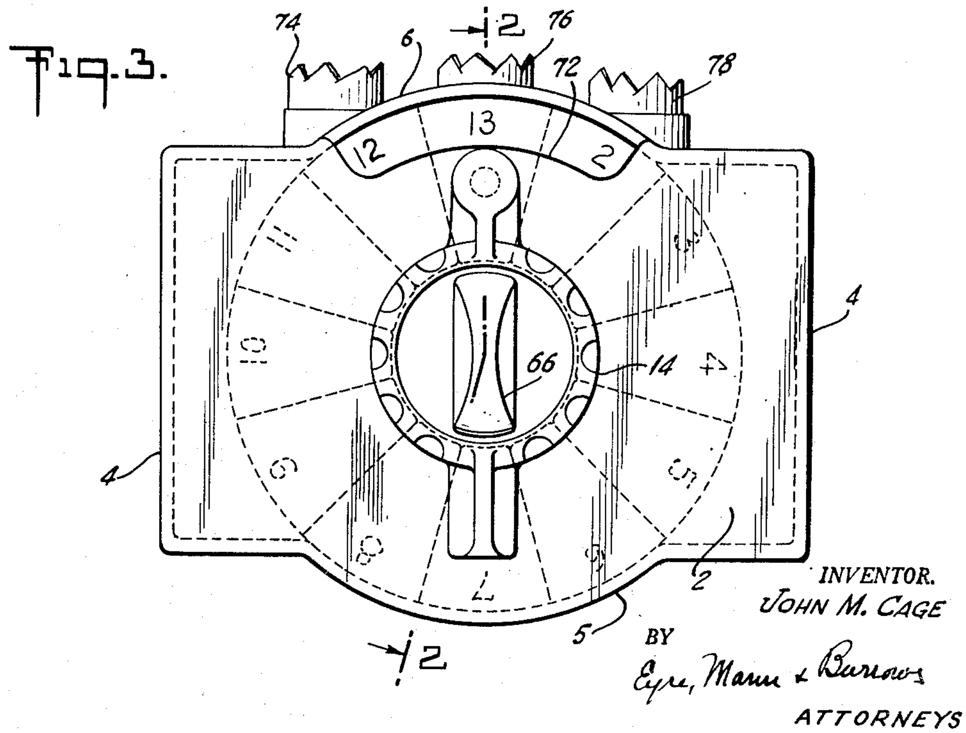
Fig. 3 is an end view of the structure of Fig. 2 looking in the direction of the arrow 3.
Figure 4:
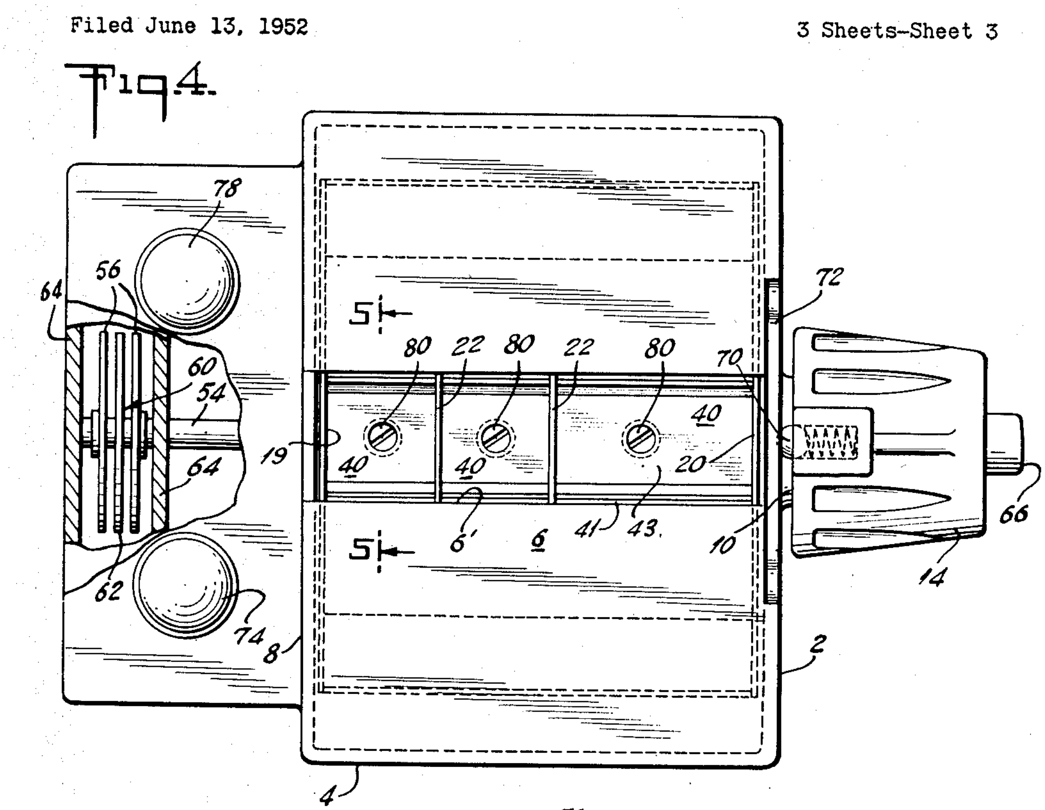
Fig. 4 is a top plan view taken along the line 4—4 of Fig. 2.
Figure 5:
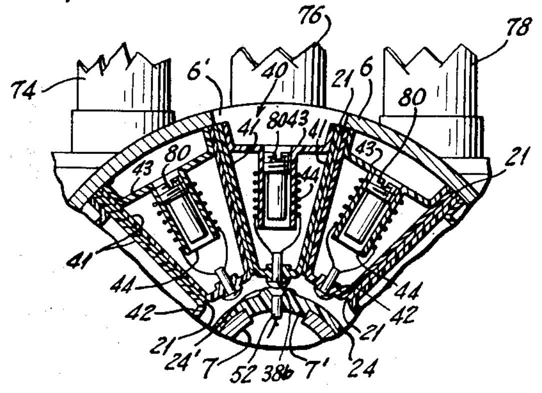
Fig. 5 is a partial vertical sectional view taken on the line 5—5 of Fig. 4.

Mounted within the rotatable shaft 12 is a rod 54 which extends through the interior of the part 7 and carries at its rear end the movable plates 56 of a condenser indicated generally at 60, which serves, as hereinafter explained, for fine tuning of the circuits, the fixed plate 62 of the condenser being insulatedly mounted in a bracket 64 integral with or secured to the housing. A button 66 on the forward end of the shaft 56 and inset in a recess 68 in the outer end of the knob 14 serves for adjustment of the capacity of condenser 60. Preferably a spring-pressed ball 70 carried in a recess in the knob 14 and cooperating with indentations in the outer surface of panel 2 serves to insure accurate positioning of the knob 14 and therefore also of the drum 18 at each channel position. As indicated in Fig. 3, the drum 18 around the periphery of its outer face may carry suitable numerals indicative of the various channels. The panel 2 conceals from view the various channel numbers except that selected and those neighboring the selected channel, panel 2 being cut away at 72 to render visible these three channel numbers. Mounted on the housing at the rear of the drum 18 are three electronic tubes 74, 76 and 78, the circuits of which are completed through the elements carried by the drum 18.

When a channel has been selected, the particular tunable circuits for that channel will be in the position shown in Fig. 2, namely along the upper surface of the part 7 and with the contacts thereof in engagement with the fixed contacts. In this position the cores 80 of the inductors are readily accessible through the opening 6′ and hence tuning of the circuits by adjustment of the positions of the cores 80 longitudinally of the tubular projections 44 can be effected without removal of the tuning head from the chassis of the receiver, and while the tunable circuits are coupled with the remainder of the receiver. Moreover, because of the complete isolation of each set of tunable circuits from every other set, tuning of the circuits for one channel will not interfere with those previously tuned for other channels. This is an important feature of the invention as it eliminates the customary necessity for retuning circuits already tuned due to inter-relationship between tunable circuits of different channels.

The circuit arrangement of the above described selector will be clear by reference to Fig. 1, wherein the rows of contacts alined with channel numbers 2 through 13 along the righthand side of the figure correspond to the contacts carried by the drum 18. The contacts corresponding to channel 13 are shown as in engagement with fixed contacts 46 to 53 carried by the part 7. When the drum 18 is rotated, the various contacts of the different channels are brought into engagement with the fixed contacts 46 to 53 and the contacts associated with channel 13 are moved out of engagement with the fixed contacts.

In the following description of the circuit of Fig. 1, for convenience the specific inductors of channel 13 are mentioned. It will be understood that the corresponding elements of another channel will replace those of channel 13 when the drum 18 is rotated to select such other channel. Fixed contacts 46 and 48 are connected to the antenna (not shown) for connection to the antenna coil 28 through contacts 28*a* and 28*b*. Inductor 30 is grounded at one end through fixed contact 49 and connected at its other end through contact 47 and a condenser 83 with the control grid of tube 74. The grid of tube 74 is also connected to a volume control circuit of the receiver (not shown). The anode of tube 74 is connected to a source of positive potential, indicated as B+, through a dropping resistor 84 and a lead 86. The anode of this tube is also connected through a condenser 88 and tunable inductor 34 with the control grid of the radio frequency amplifier tube 78, the anode of which connects with the intermediate frequency part of the television receiver. Tube 76, comprising the radio frequency oscillator, has its control grid connected through tunable inductor 38 and a condenser 89 to its anode. The anode of tube 76 is also connected through a condenser 90 with the control grid of the radio frequency amplifier 78 and, through an inductor 92 and resistance 94, with lead 86. The screen grid of the radio frequency amplifier 78 is connected to line 86 through a resistor 98. The condenser 60 comprising the means for fine tuning of the circuits is connected between ground and the lead 100 connecting condenser 89 with fixed contact 53.

From the above description it will be apparent that tubes 74, 76 and 78 will be automatically coupled to the tunable circuits for each channel by rotation of the drum 18 to the desired position for selection of a channel and that in each such position the tunable circuits of the remaining channels are open at the drum contacts. In each position of the drum the condenser 60 is connected in the circuit of the oscillator tube 76, permitting fine adjustment of reception.

The invention has now been described with reference to one particular embodiment thereof. It will be apparent that the new tuner can be readily incorporated in television receivers of different specific circuit arrangements and that it provides a means for ready selection of the desired channel and for tuning of such channel during connection of the tunable circuits to the remainder of the set. No complicated gearing is required nor does the tuner occupy an inordinate amount of space. The construction of the tuner and particularly of the drum with its separate removable support means for the units, permits ready substitution of circuit elements and insures complete electrical isolation of the parts. Although the drum of the new tuner has been shown and described as having twelve different rows of compartments for accommodation of tunable inductors for channels 2 through 13, obviously the drum could have a greater or a less number of rows of compartments and, because of the specific construction permitting ready removal of the circuit carrying parts of the drum, tunable elements for channels other than the specifically identified channels could be incorporated whenever desired and circuit elements other than or in addition to inductors could be carried within the compartments of the drum.

I claim:

1. A channel selector for television receivers comprising a fixed hollow shaft insulatedly carrying a longitudinal row of contacts, a framework to which said shaft is secured, circuit elements mounted on said framework and electrically connected to said contacts by leads disposed within the shaft, a drum-like member mounted for rotation about said shaft, said member being formed of end parts interconnected by radially disposed longitudinal vanes forming longitudinal chambers open toward said shaft and at the periphery of the drum-like member, a plurality of generally cup-shaped members of insulating material fitting within each chamber and dividing the same into compartments each closed at its base adjacent said shaft, tunable circuit elements mounted in said compartments, contact pins penetrating the bases of said compartments and electrically connected to the tunable elements, said pins being disposed for engagement with the contacts on said shaft in one angular position of the associated row of compartments, said framework forming a casing about said rotatable member while permitting access through an opening therein to the compartments in said one angular position whereby the circuit elements therein may be tuned while electrically connected through said pins, shaft carried contacts and leads to the circuit elements carried by the framework, and means for rotating said drum-like member to bring any desired row of compartments into said one angular position.

2. The selector according to claim 1 including a tunable circuit element mounted on said framework and electrically connected to said framework carried circuit elements, a rod extending through said shaft and coupled to said last mentioned tunable element and separate means for rotating said rod to tune said element.

3. The selector according to claim 1 wherein said tunable elements are inductors provided with adjustable cores of permeable material, said inductors being radially disposed within said compartments for ready access to the cores thereof through the opening in said framework.

4. The selector according to claim 1 wherein there are three compartments in each longitudinal chamber, the tunable elements in one of said three chambers being two inductively coupled coils, and in each of the other two compartments being a single inductor, all of said inductors having movable cores of permeable material.

5. The selector according to claim 1 wherein said cup-shaped members are removable through said opening in the framework.

6. The selector according to claim 1 wherein said circuit elements carried by said farmework comprise electronic tubes and partial circuits therefor adapted to be completed by the tunable elements mounted within the compartments of said drum-like member.

References Cited in the file of this patent

UNITED STATES PATENTS

| Number | Name | Date |
|---|---|---|
| 1,678,032 | Bergman | July 24, 1928 |
| 2,078,909 | Gunther | Apr. 27, 1937 |
| 2,496,183 | Thias et al. | Jan. 31, 1950 |
| 2,545,681 | Zepp et al. | Mar. 20, 1951 |
| 2,551,228 | Achenbach | May 1, 1951 |